L. BARKER.
TRAP.
APPLICATION FILED OCT. 25, 1911.

1,027,974.

Patented May 28, 1912.

WITNESSES
Geo. Bambay.
L. J. Gallagher.

INVENTOR
Lee Barker
BY
ATTORNEYS

UNITED STATES PATENT OFFICE.

LEE BARKER, OF MARICOPA, CALIFORNIA.

TRAP.

1,027,974.    Specification of Letters Patent.    Patented May 28, 1912.

Application filed October 25, 1911. Serial No. 656,717.

*To all whom it may concern:*

Be it known that I, LEE BARKER, a citizen of the United States, and a resident of Maricopa, in the county of Kern and State of California, have invented a new and Improved Trap, of which the following is a full, clear, and exact description.

My invention relates generally to traps, and the principal object thereof is to provide a new and useful structure which will operate in a satisfactory and efficient manner, the arrangement and number of the parts being such that a device of this class may be produced at a low cost.

Other objects and advantages of the invention will appear as the description of the invention proceeds, the new and novel features being included within the appended claims.

Reference is to be had to the accompanying drawings, forming a part of this specification, in which similar characters of reference indicate corresponding parts in all the figures, and in which—

Figure 1:
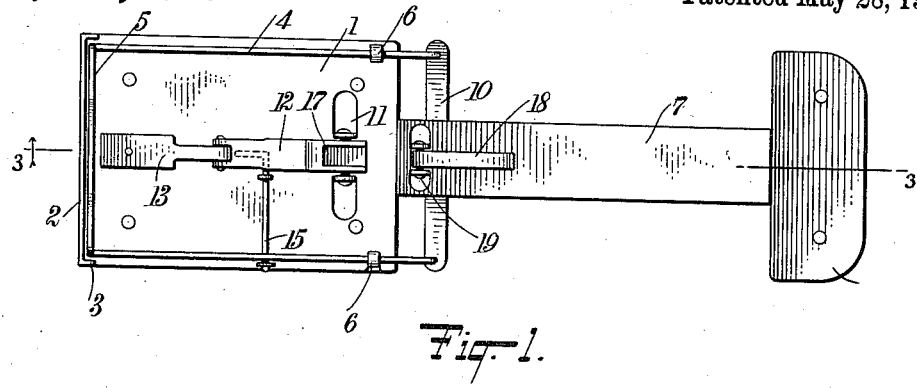
Figure 2:
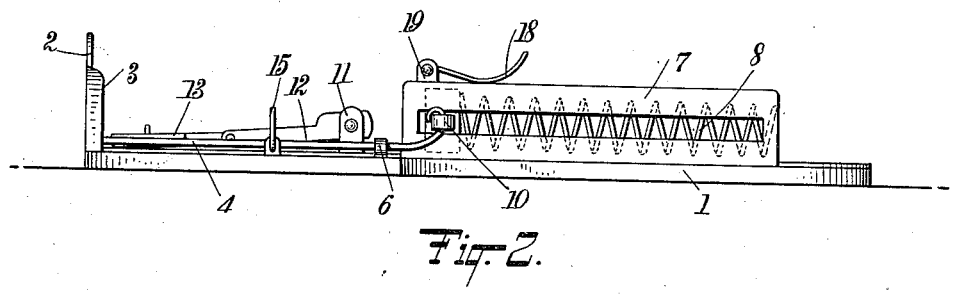
Figure 3:
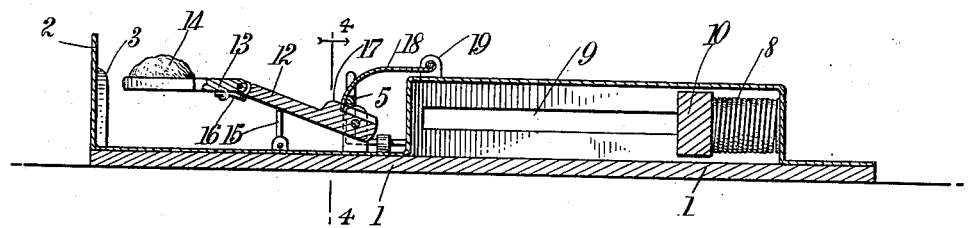
Figure 4:
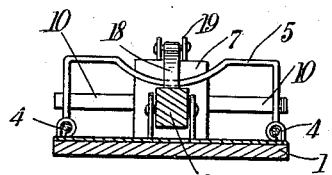

Figure 1 is a top plan view of the trap in inoperative position; Fig. 2 is a side view thereof; Fig. 3 is a vertical sectional view thereof on the line 3—3 of Fig. 1, the trap being in operative or set position, and Fig. 4 is a vertical sectional view on the line 4—4 of Fig. 3.

The trap is made up of a suitable supporting member 1 having a fixed jaw 2 at one end thereof, the opposite sides of the jaw being provided with projections 3. The movable jaw is made up, preferably, of a wire frame 4 of rectangular construction, the end 5 thereof being adapted to coöperate with the fixed jaw 2 in order to hold the animal when the trap is sprung, there being guides 6 on the supporting member 1 in which the frame 4 is adapted to reciprocate. Intermediate of the ends of the supporting member 1, is a suitable housing 7 having a helical spring 8 positioned therein, one end of the spring bearing against one end of the housing, opposite sides of the housing being provided with slots 9 through which a cross arm 10 extends, the outer ends of which are in engagement with the ends of the frame 4 which carries the movable jaw. The spring 8 is adapted to be held in compressed position, as shown particularly in Fig. 3, thereby holding the movable jaw 5 remote from the fixed jaw 2, suitable means being provided for holding the parts in such position, these means being preferably of the following construction.

Pivotally mounted adjacent the front of the supporting member 1, in suitable brackets 11, is a platform 12 having a hinged forward end 13 adapted to hold suitable bait 14, the bait being positioned adjacent the fixed jaw 2 and the platform being conveniently brought to elevated position as shown in Fig. 3, by suitable means, such as a lifting shaft 15. It is to be noted that while the platform 12, when the parts are in operative or set position, extends angularly in respect to the supporting member 1, the forward or bait-holding portion 13 lies substantially horizontal, being maintained in such position by a suitable catch 16 carried by the under side thereof and bearing against the part 12. Such construction permits greater movement to the outer end of the platform in order to release the movable jaw, thereby permitting greater security in setting the trap; the part 13, however, when it approaches the supporting member 1 moving relatively to the part 12, so that both of the parts rest on this supporting member, as shown particularly in Fig. 2.

The intermediate portion of the platform 12 is provided with a shoulder 17, against which the outer end of the detent 18 engages when the trap is set, the other end of this detent being pivotally mounted between suitable legs or standards 19.

In order to set the trap, the cross arm 10 is pushed to the rear until the spring 8 is compressed and the pivoted detent 18 is then brought into engagement with the shoulder 17 on the platform 12, the movable rod 5 being in the rear of this detent 18, all of which is indicated in Fig. 3. The platform may be raised by operation of the lifting shaft 15. The mouse or other animal attacking the bait 14 will bring weight to bear on the platform 12, thereby lowering this platform, such movement releasing the engagement of the detent 18 with the shoulder 17 and permitting the movable jaw 5 on the frame 4, to move forwardly, and thereby hold the animal between this jaw and the fixed jaw 2.

By reason of the fact that the cross arm 10 with the movable frame 4, lies and moves in a horizontal plane, I am enabled to provide a trap of very little height, especially adapted for use in small places where the ordinary trap having vertically-extending parts could not be positioned.

The material of which the different parts are made will depend largely upon the construction of the trap, certain parts being preferably made of metal while other parts may be conveniently made of wood, these changes being largely matters of expediency and included within the spirit of the following claims.

Having thus described my invention, I claim as new, and desire to secure by Letters Patent:—

1. A device of the class described, comprising a fixed jaw, projections at opposite sides thereof, a horizontally movable jaw, guides in which the movable jaw operates, a cross arm as an element in the said movable jaw, a housing having slots therein, said cross arm reciprocating in the slots, a helical spring within the housing for maintaining the movable jaw adjacent the fixed jaw, a pivotally supported platform adjacent the fixed jaw, a shoulder on the platform, together with a detent for engagement with the shoulder and the movable jaw for holding it remote from the fixed jaw, the platform being maintained in elevated position, a downward movement of which releases the engagement between the said detent and the shoulder, thereby permitting the movable jaw to come adjacent the fixed jaw.

2. A device of the class described, comprising a supporting member, a fixed jaw at one end thereof, projections at opposite sides of the fixed jaw, a housing carried by the said member, the opposite sides of the housing being provided with slots, a horizontally movable jaw carried by the said member, guides on the supporting member in which the movable jaw operates, a cross arm connected to the movable jaw, the cross arm being positioned within the slots in the said housing, a helical spring within the housing for maintaining the movable jaw adjacent the fixed one, a pivotally supported platform on the said member, a shoulder on the platform, a detent pivotally supported on the housing, the detent being adapted for engagement with the shoulder and the movable jaw for holding it remote from the fixed jaw, the platform being maintained in an elevated position, a downward movement of the platform releasing the engagement between the detent and the shoulder, thereby permitting the movable jaw to come adjacent the fixed jaw.

In testimony whereof I have signed my name to this specification in the presence of two subscribing witnesses.

LEE BARKER.

Witnesses:
A. C. MASON,
ED. PERKINS.

---

Copies of this patent may be obtained for five cents each, by addressing the "Commissioner of Patents, Washington, D. C."